(12) United States Patent
Boyer et al.

(10) Patent No.: US 8,111,907 B2
(45) Date of Patent: Feb. 7, 2012

(54) METHOD FOR REPEATABLE OPTICAL DETERMINATION OF OBJECT GEOMETRY DIMENSIONS AND DEVIATIONS

(75) Inventors: Jesse R. Boyer, Berlin, CT (US); Jeffry K. Pearson, Newport Beach, CA (US); Benjamin W. Meissner, San Antonio, TX (US); Randall W. Joyner, Union, CT (US); James Romanelli, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 1225 days.

(21) Appl. No.: 11/888,006

(22) Filed: Jul. 31, 2007

(65) Prior Publication Data

US 2009/0033947 A1   Feb. 5, 2009

(51) Int. Cl.
*G06K 9/00* (2006.01)
(52) U.S. Cl. ...................................... 382/154
(58) Field of Classification Search .............. 382/154
See application file for complete search history.

(56) References Cited

U.S. PATENT DOCUMENTS

| 5,175,601 A | 12/1992 | Fitts |
| 6,064,759 A | 5/2000 | Buckley et al. |
| 7,184,036 B2 | 2/2007 | Dimsdale et al. |
| 7,206,080 B2 | 4/2007 | Kochi et al. |
| 7,215,430 B2 | 5/2007 | Kacyra et al. |
| 2003/0038933 A1* | 2/2003 | Shirley et al. ............. 356/243.1 |

OTHER PUBLICATIONS

"The Basics of Photogrammetry", Geodetic Services Inc., from http://www.geodetic.com/whatis.htm, visited Jul. 25, 2007 (32 pages).

* cited by examiner

*Primary Examiner* — Daniel Mariam
*Assistant Examiner* — Elisa Rice
(74) *Attorney, Agent, or Firm* — Kinney & Lange, P.A.

(57) ABSTRACT

A method for inspecting geometrical shapes of objects to determine selected dimensions thereof based on data characterizing such objects obtained through stereoscopic photographs taken by a pair of cameras with fields of view intersecting to thereby provide a photographic event measurement volume that includes at least a portion of each of such objects being photographed. The method involves using previously specified procedures to check on the cameras performance consistency in photographing from different positions, preparing the object to be inspected including providing reference point targets thereon, scanning that object with the cameras from different camera pair positions, processing the resulting data to represent the scan basis geometrical shape of the object, and orient it to compare with the dimensional specifications therefor.

14 Claims, 3 Drawing Sheets

METHOD FOR REPEATABLE OPTICAL DETERMINATION OF OBJECT GEOMETRY DIMENSIONS AND DEVIATIONS

BACKGROUND

The present invention relates to inspecting various kinds of objects and, more particularly, to optically inspecting the geometry of such objects.

Various objects prepared for incorporation in corresponding arrangements must often, for those arrangements to have sufficient quality for their intended use or uses, satisfy a variety of criteria to be suitable for those arrangements. Thus, for example, components for machine assemblies frequently have exacting geometrical shape requirements to fit and operate properly in those assemblies. Therefore, the dimensions of such components must be verified prior to assembly to assure both component quality and assembly quality.

However, many kinds of components are of a significant size and have relatively complicated geometrical shapes making the measuring of their various dimensions tedious and prone to repeatability errors as well being slow and expensive. As a result, various kinds of remote sensing arrangements have evolved, often termed close range digital photogrammetry or machine vision metrology, to determine from photographic images the geometrical characteristics of objects subjected to this measurement process. The technology, though, involves many steps in its application including a substantial fraction in which even small variations can vary the results obtained in the process from what they would otherwise be. Thus, there is a desire for a method of optically inspecting objects that provides repeatable and accurate results.

SUMMARY

The present invention provides a method for inspecting geometrical shapes of objects to determine selected dimensions thereof based on data characterizing such objects obtained through stereoscopic photographs taken by a pair of cameras with fields of view intersecting to thereby provide a photographic event measurement volume that includes at least a portion of each of such objects being photographed. The method comprises ascertaining in a previously specified procedure that consistent data is obtained from each of the stereoscopic photographs taken by the pair of cameras at each of a plurality of different camera pair locations about a selected ascertainment target. An object to be inspected is then prepared in a previously specified procedure for being photographed by the pair of cameras including positioning reference point targets at specified locations thereon followed by operating the pair of cameras in a previously specified procedure to take stereoscopic photographs at each of a specified sequence of different camera pair positions about the object to be inspected with the cameras oriented differently with respect to the object to be inspected at each of these positions such that a portion of the object to be inspected is in the photographic event measurement volume at each of those positions including the reference point targets thereat, these photographic event measurement volumes each overlapping at least one other and cumulatively encompassing the object to be inspected. The data obtained from the stereoscopic photographs is processed in a previously specified procedure to provide a representation of the scan basis geometrical shape of the object to be inspected followed by orienting the scan basis geometrical shape of the object to be inspected in the representation thereof to allow a comparison in a previously specified procedure of dimensions of specified portions of the scan basis geometrical shape with the dimensions of those corresponding portions of the specified geometrical shape of the object of the object to be inspected in a representation thereof.

DETAILED DESCRIPTION

Figure 1:
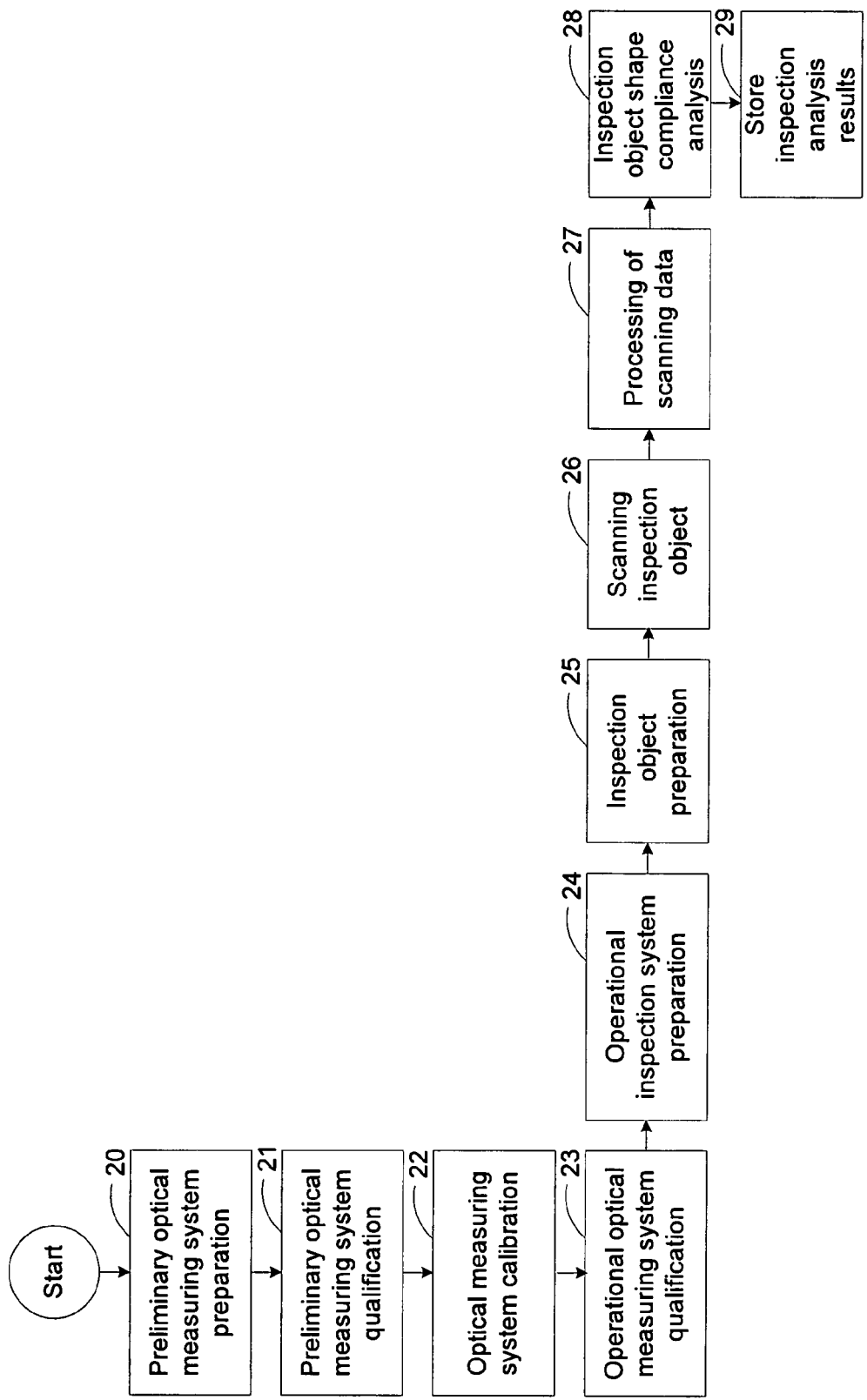
FIG. 1 shows a flow chart setting out the steps in the geometrical shape inspection of an object in the present invention.
Figure 2:
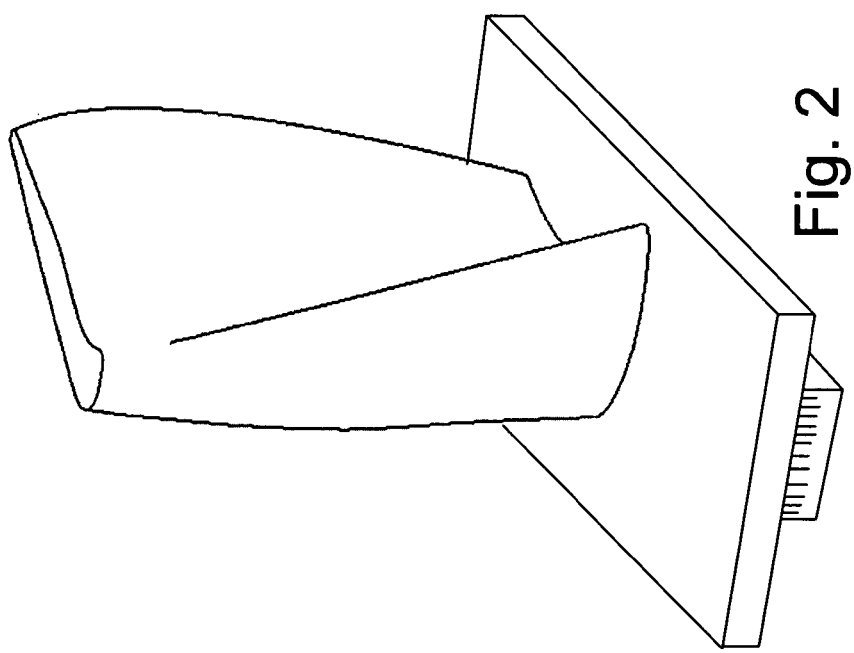
FIG. 2 shows a perspective view schematic diagram of an example of an object to be inspected for a complying geometrical shape.

FIG. 1 shows a flow chart for a method of optically inspecting objects such as machine assembly components for their geometrical shape properties to verify that the various dimensions thereof comply with the dimensions and tolerances specified therefor. An example of such an assembly component is a gas turbine engine airfoil for which example a representation is given in the perspective view schematic diagram of FIG. 2.

Such optical inspection is accomplished, as indicated above, through use of a kind of close range, digital, fringe pattern projection based photogrammetric technology based on use of at least two digital cameras each, together in a photographic measurement event, taking a photograph of the object being inspected with an alternating light and dark fringe pattern projected thereon from a corresponding location differing from that of the other along the corresponding line of sight from that location to that object such that these lines of sight intersect at the location of the object being inspected. The choice of lens for each camera determines its field of view and the intersection of these fields of view determine the spatial measurement volume from within which geometric information about the shape of object can be obtained. Such information is obtained from fringe based triangulation methods, involving photographed points on the surface of the object being inspected within the measurement volume and the two camera locations used in that photographing, as computed in an associated computer or computers.

Figure 3:
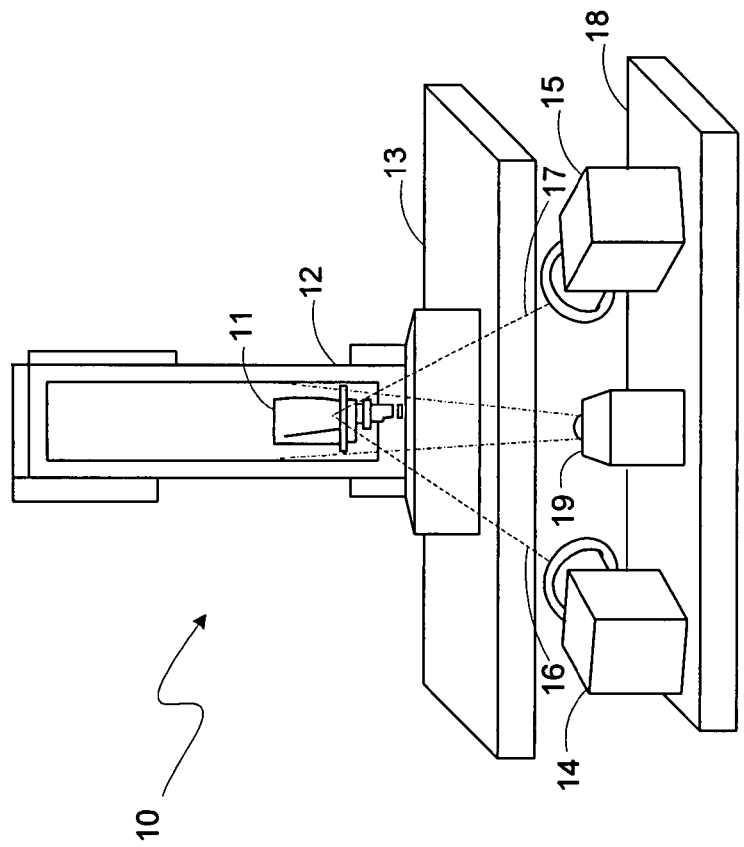
FIG. 3 shows a perspective view of a schematic representation of an optical measurement system.

FIG. 3 shows a schematic representation of a such a kind of a fringe pattern projection based photogrammetric measurement arrangement, 10, including an object to be inspected in a perspective view schematic diagram. There, a representation of a turbine engine airfoil, 11, under optical inspection is presented in a component holding fixture, 12, shown in representational form resting on a partially shown support, 13, to a pair of digital cameras, 14 and 15. A dashed line, 16, extends from the lens of camera 14 to airfoil 11 to indicate the corresponding camera line of sight and a dashed line, 17, extends from the lens of camera 15 to airfoil 11 to again indicate the corresponding camera line of sight with each line being at an angle (typically around 30°) to a midplane (not shown) between the cameras to the point on airfoil 11. Cameras 14 and 15 are supported on a mount, 18, that can be moved both in translation and in angular pose to permit these cameras to provide photographic measurement events from different locations about airfoil 11. Also supported on mount 18 is a fringe pattern projector, 19, for projecting an alternating light and dark fringe pattern onto airfoil 11.

Accurate and repeatable geometrical shape measurement results are obtained in arrangement 10 through careful and precise calibration of the cameras and in carefully following strict procedures in obtaining and manipulating the camera data with respect to airfoil 11 until the final results of this inspection process become available. As indicated in FIG. 1, the first step in the process, 20, is doing the preliminary measuring system preparation. This involves fitting cameras 14 and 15 in the optical measuring system with the proper lenses for the coming qualification and calibration steps to provide the desired measurement volume therefor, then positioning the cameras to place the measuring volume in the proper location for those tests, and finished by readying those cameras for operation according to a previously specified procedure.

Such preparation is followed by performing a specified preliminary measuring system qualification in a further step, 21, to determine that the optical measuring system has its measurement volume resulting from the lenses chosen to be used with cameras 14 and 15 for calibration is suitably sized and positioned for that calibration. An optical gage block with precisely positioned dots inscribed thereon is prepared and positioned in the measurement volume in a dozen or so different orientations with respect to cameras 14 and 15 with those cameras photographing that block in each such position and the associated computer storing the data therefrom. The data stored from these photographs is used to compute a system pixel deviation for the measurement volume over these various positions which must be within selected limits to permit proceeding to calibration. Otherwise, the optical measuring system must have its camera components internally adjusted or repaired until the pixel deviation limit is satisfied.

Figure 4:
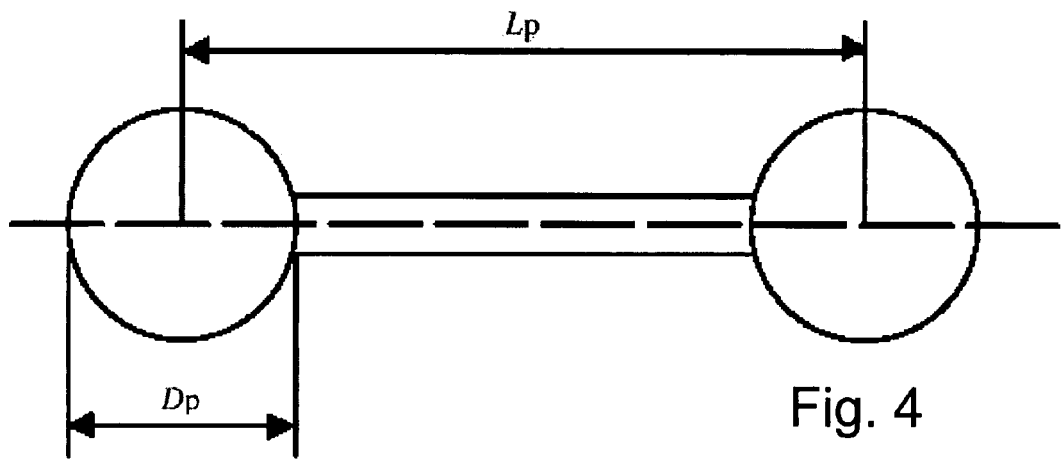
FIG. 4 shows a schematic representation of physical standard used for calibrating the system of FIG. 3.

Calibration of cameras 14 and 15 undertaken in a previously specified procedure in the next step, 22, in FIG. 1 is necessary to assure that the data obtained from photographs taken by them provides accurate indications of the geometrical shapes of the objects photographed. Such calibration is based on the results of these cameras photographing physical standards, two of which have dimensions traceable back to those set therefore at the National Institute of Standards and Technology (NIST). The first, a "ball bar", is a non-specular ceramic body (or equivalent) represented in the side view diagram of FIG. 4 having diameter $D_p$ between one tenth and two tents of the length of the diagonal of the measurement volume and the separation length $L_p$ less than one third of that diagonal length. This ball bar is photographed by stationary cameras 14 and 15 in seven different previously specified positions and orientations in the measurement volume and the associated computer stores the data therefrom. A length error is determined by the computer or computers from this data based on the sphere-spacing length measured at each position and a probe error is determined based on the range of radial deviations of the sphere diameters measured at each position with these errors required to be less than selected limits.

Figure 5:
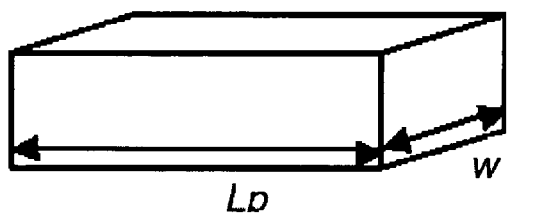
FIG. 5 shows a schematic representation of another physical standard used for calibrating the system of FIG. 3.
Figure 6:
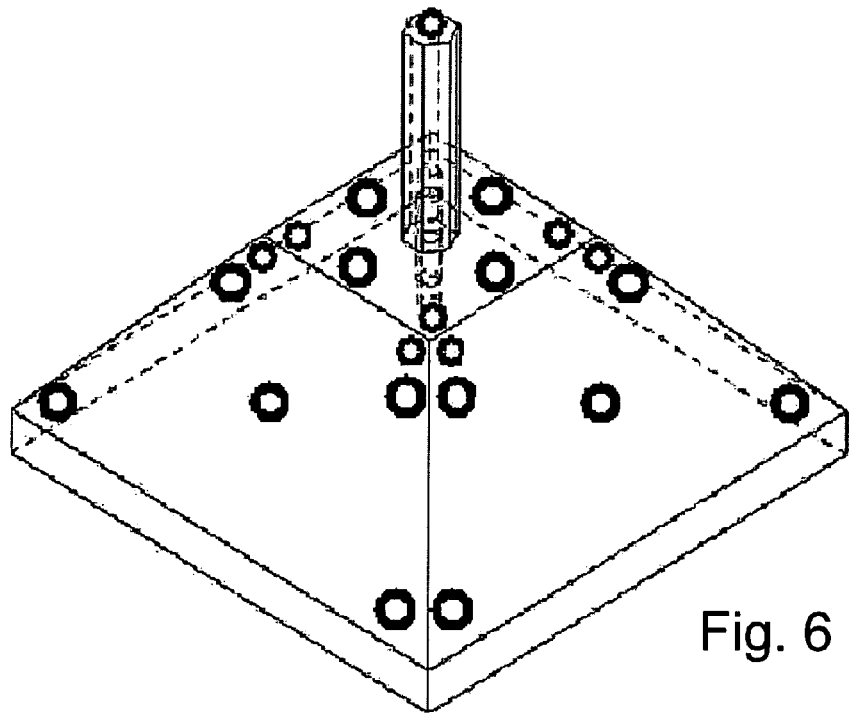
FIG. 6 shows a schematic representation of an optical data coordination ascertainment target.

The second traceable standard is a parallel face bar represented in the perspective view diagram of FIG. 5 that is polished to a flatness typically less than one ten thousandth of an inch and typically coated with a suitable coating to maintain flatness while minimizing reflections and providing an acceptable color for photographing such as typically a baked-on graphite lubricant. $L_p$ here is greater than one half of the measurement volume diagonal length with w equaling or exceeding 50 millimeters. This bar is photographed by stationary cameras 14 and 15 in six different previously specified positions and orientations in the measurement volume and the associated computer stores the data therefrom. A mean plane surface is determined by the computer or computers from this data and a flatness error at various locations is found which again must be within a selected limit.

A further sort of calibration is specified to be done to provide a basis for increasing the measurement volume available to allow inspecting objects that are larger than the measurement volume provided by the intersecting fields of view of cameras 14 and 15 in a single photographic measurement event. This enlarged measurement volume is cumulative volume provided through combining overlapping measurement volumes each corresponding to one in a sequence of photographic measurement events that are each accomplished at a different position of cameras 14 and 15 to a stationary target specifically prepared for this process. Thus, this calibration process is not done to relate data obtained by photographs of prescribed physical standards to assure camera accuracy, but instead, is done to assure there is an accurate correlation between the corresponding sets of photographic data obtained from the sequence of photographic measurement events taken at a different camera positions during the process. As a result, cameras 14 and 15 can thereafter use any position in photographing an object that has the measurement volume for the corresponding photographic measurement event within the cumulative volume and obtain accurate geometrical shape data for that object. Furthermore, the data from any such photographing can be manipulated so as to have the corresponding geometrical shape measurements derived therefrom be accurate for the object when considered as being viewed from a different vantage point than that of any location used by cameras 14 and 15 in obtaining that photographic data.

This data coordination checking calibration process involves cameras 14 and 15 photographing together over a specified series of different camera pair locations about a target that is formed from a black resin material base target in the shape of a four sided prism truncated below the common peak point to have a square, flat top surface supporting a removeable black resin material hexagonal oblong offset post. This black base and post have mounted over their outer surfaces various sized white dots that approximately span a photographic measurement event measurement volume (different sized dots can be associated with different measurement volumes resulting from different camera lens choices), and images of these dots are all that show up in the data stored by the associated computer or computers from the photographs taken by cameras 14 and 15 because of this black color behind them. The post is chosen in length to have its top, and the white dot thereon, positioned at the upper side of the measurement volume, and the other dots are positioned, for the measurement volume being used, to generally span the remaining parts of that measurement volume.

Cameras 14 and 15 take photographs of the white dots in six separate photographic measurement events over five different specified camera pair positions with respect to the corresponding set of white dots that are stationary during the events as the target they are supported upon remains stationary. An initial camera pair position, conveniently chosen to be having the midplane between cameras 14 and 15 intersecting the top of the post from above, is used both for the first cameras photographing position and for the last photographing position. The remaining camera pair photographing positions include cameras 14 and 15 facing sides of the truncated prism and facing the prism from a location below it. In each photographing position, the white dots must be sufficiently visible so as to allow each camera to record ten different lengths between the various white dots.

The computer or computers associated with cameras 14 and 15 must recognize the corresponding set of white dots from the images thereof taken in each photographing position to compute a linear error based thereon to be capable of being within the selected limit for that error. This linear error is taken as the greatest absolute value difference between any measured length between recognized dots and the known value of that length between those dots on the target. The computers may also compute a spatial error as the greatest absolute value difference for the value of a combination of lengths between various selected dots measured at a camera photographing position different than the first and final positions and the value of that combination at those initial and final positions.

Completion of calibration for the optical measurement system in arrangement 10 of FIG. 3 readies it for use in inspecting selected objects such a gas turbine engine airfoils using this calibrated arrangement and the associated computer or computers provided in the inspection system. The size of the object to be measured during an inspection of the dimensions thereof to determine compliance with the specification therefor, here an airfoil, sets the necessary measurement volume and so the set of camera lenses to be used with cameras 14 and 15. The size of the image capture sensors in those cameras determines the measuring distance to be used between the cameras and the object to be photographed. Thus, the photographing of a different object than that which was inspected previously requires that the optical measuring system be qualified again in an operational measuring system qualification step, 23, in FIG. 1 as do any adjustments of the camera lenses or any adjustments of the relative positions of cameras 14 and 15. The same specified procedure is followed in this step as in preliminary measuring system qualification step 21 using an optical gage block.

The object to be inspected, airfoil 11, must be properly mounted in the version of holding fixture 12 specified therefor in this inspection process as indicated in an operational inspection system preparation step, 24, in FIG. 1, and the fixture with the airfoil positioned at the proper specified measuring distance to be used between the cameras and the airfoil specified in this procedure for an airfoil inspection. If use of polarizing filters with cameras 14 and 15 is specified for the airfoil inspection, they are suitably positioned on the camera lenses and adjusted. The computer programs and databases specified for use with the inspection system in inspecting airfoils are provided in, or are verified to be available to, the computer or computers in the inspection system.

Also, airfoil 11 must be prepared in a previously specified procedure to undergo inspection in this inspection system as undertaken in an airfoil inspection preparation step, 25, in FIG. 1. The surfaces thereof can be altered as specified to control the reflectivity thereof, the emissivity thereof, and the color continuity thereof. This is accomplished through specified steps for airfoil 11 such as use of a developer spray applied using an airbrush, grain etching using a minimum strength acid, or causing particulates or vapors to impact those surfaces.

In addition, reference point targets are mounted on airfoil 11 or holding fixture 12, or both, for use in coordinating the corresponding sets of photographic data obtained in each of cameras 14 and 15 from a corresponding sequence of photographic measurement events taken at different positions of that camera pair (the "scanning" of the object to be inspected) to be undertaken subsequently in the inspection process. These targets can again be white dots of a diameter sufficient to span six to ten pixel positions of the image capture sensors in cameras 14 and 15. These dots are mounted in specified positions for airfoil inspections that are randomly spaced but having a sufficient number so that at least six to eight of them occur in the measurement volume for each photographic measurement event.

Scanning of airfoil 11 is then undertaken in a step, 26, of FIG. 1 for scanning the object being inspected following a specified procedure. As indicated above, this involves performing a specified sequence of photographic measurement events taken at specified different camera positions about airfoil 11 and holding fixture 12. These positions were selected in conjunction with the selection of positions for the reference point targets to allow obtaining corresponding sets of photographic data from that sequence of photographic measurement events that can be the basis for providing a suitably accurate representation of the geometrical shape of airfoil 11. The basis for these selections includes at least providing for some overlap of the measurement volume resulting at each camera pair position with the measurement volume resulting at some other one of those camera pair positions.

The resulting database representing the surface of airfoil 11 is a collection of suitable geometric coordinates of points on that surface, sometimes referred to as a "point cloud". In a specified inspection system data processing step, 27, in FIG. 1 of this scanned data, the computer or computers associated with the inspection system in specified procedures typically transform this data in a polygonization process into a triangular mesh without overlap, then smooth this mesh to an extent by mathematically adjusting the positions of the points in this mesh, and finally reduce the number of points in the mesh by removing those contributing relatively little information as to geometrical shape of airfoil 11.

This data processing provides a representation of the geometrical shape of airfoil 11 which must then be compared to the specification for that airfoil to determine whether the shape dimensions thereof satisfy the tolerances of that specification. Such an analysis is performed in a specified manner in an airfoil shape compliance analysis step, 28, in FIG. 1. The specification for the geometrical shape of an object being inspected can take various alternative forms, the choice of which often depends on the nature of the object being inspected. One effective method for an object with a complicated curved surface geometry such as that of airfoil 11 is to compare the shape of airfoil 11, resulting from the scanning thereof followed by the specified processing of the scan data, with the data in the database representing the computer aided design of that airfoil in a computer aided design computer program. Such a comparison can be made, for example, by aligning the geometrical shape of airfoil 11 resulting from the scanning thereof to a specified view of that airfoil in the computer aided design thereof and noting any differences therebetween. This can be aided, for example, by specifying a side view and dividing the view into sections along the length thereof in both the scanned representation of airfoil 11 and the computer aided design thereof and then comparing the dimensions in each view section by section to determine the presence of any deviations. Any such deviations can then be reviewed as to whether they are within the specified tolerances, and then this process can be repeated for another specified view. The results are then stored in a specified format in a storage step, 29, in FIG. 1.

The various previously specified procedures specifying the steps indicated in FIG. 1 are assembled in a master database which is strictly controlled, insofar as making any changes as to what is specified therein, by an assigned control entity. Thus, this master database can be distributed to various users or potential users to assure that all have in effect a common definition of the object to be manufactured and inspected, here, in the foregoing example, airfoil 11.

Although the present invention has been described with reference to preferred embodiments, workers skilled in the art will recognize that changes may be made in form and detail without departing from the spirit and scope of the invention.

The invention claimed is:

1. A method for inspecting geometrical shapes of objects to determine selected dimensions thereof and comparing the dimensions to specifications for the objects, with dimensions determined based on data characterizing such objects obtained through stereoscopic photographs taken by a pair of cameras with fields of view intersecting to thereby provide a photographic event measurement volume that includes at least a portion of each of such objects being photographed, the method comprising:

ascertaining that consistent data is obtained from each of the stereoscopic photographs taken by the pair of cameras at each of a plurality of selected different camera pair locations about a selected ascertainment target, preparing an object to be inspected for being photographed by the pair of cameras including positioning reference point targets at selected locations thereon, operating the pair of cameras to take stereoscopic photographs at each of a selected sequence of different camera pair positions about the object to be inspected with the cameras oriented differently with respect to the object to be inspected at each of these positions such that a portion of the object to be inspected is in the photographic event measurement volume at each of those positions including the reference point targets thereat, these photographic event measurement volumes each overlapping at least one other and cumulatively encompassing the object to be inspected, processing the data obtained from the stereoscopic photographs to provide a representation of the scan basis geometrical shape of the object to be inspected, orienting the scan basis geometrical shape of the object to be inspected in the representation thereof to allow a comparison of dimensions of predetermined portions of the scan basis geometrical shape thereof with the dimensions of those corresponding portions of the specified geometrical shape of the object to be inspected in a representation thereof, and comparing the scan basis geometrical shape of the object to the specifications for the object to determine whether the shape dimensions satisfy tolerances for the specification.

2. The method of claim 1 further comprising calibrating the pair of cameras against physical standards prior to the ascertaining of consistent data in the stereoscopic photographs.

3. The method of claim 1 wherein the optical properties of the surface of the object to be inspected are altered in preparing the object for being photographed.

4. The method of claim 1 wherein a specified geometrical shape of the object to be inspected is represented in a computer aided design computer program database.

5. The method of claim 1 wherein the ascertaining, preparing, operating, processing and orienting are all performed in accord with corresponding previously specified procedures.

6. The method of claim 5 wherein the previously specified procedures are stored in a computer program database having access thereto controlled by a selected entity.

7. The method of claim 1 wherein the operating step further comprises six stereoscopic photographs at each of a selected sequence of five different camera pair positions about the object.

8. A method for inspecting geometrical shapes of objects to determine selected dimensions thereof and comparing the dimensions to specifications for the objects, with dimensions determined based on data characterizing such objects obtained through photographs taken by a camera with a field of view providing a photographic event measurement volume that includes at least a portion of each of such objects being photographed with a fringe pattern projected thereon, the method comprising:

ascertaining that consistent data is obtained from the photographs taken by the camera at each of a plurality of selected different camera pair locations about a selected ascertainment target, preparing an object to be inspected for being photographed by the camera including positioning reference point targets at selected locations thereon, operating a fringe pattern projector to provide an alternating light and dark fringe pattern on the object to be inspected and the camera to take photographs at each of a selected sequence of different camera pair positions about the object to be inspected having the fringe pattern thereon with the cameras oriented differently with respect to the object to be inspected at each of these positions such that a portion of the object to be inspected is in the photographic event measurement volume at each of those positions including the reference point targets thereat, these photographic event measurement volumes each overlapping at least one other and cumulatively encompassing the object to be inspected, processing the data obtained from the photographs to provide a representation of the scan basis geometrical shape of the object to be inspected, orienting the scan basis geometrical shape of the object to be inspected in the representation thereof to allow a comparison of dimensions of predetermined portions of the scan basis geometrical shape thereof with the dimensions of those corresponding portions of the specified geometrical shape of the object to be inspected in a representation thereof, and comparing the scan basis geometrical shape of the object to the specifications for the object to determine whether the shape dimensions satisfy tolerances for the specification.

9. The method of claim 8 further comprising operating a pair of cameras to take stereoscopic photographs at each of a selected sequence of different camera pair positions about the object to be inspected with the cameras oriented differently with respect to the object to be inspected at each of these positions with the pair of cameras having fields of view intersecting to thereby provide a photographic event measurement volume, and processing the data obtained from the stereoscopic photographs to provide a representation of the scan basis geometrical shape of the object to be inspected.

10. The method of claim 8 further comprising calibrating the camera against physical standards prior to the ascertaining of consistent data in the photographs.

11. The method of claim 8 wherein the optical properties of the surface of the object to be inspected are altered in preparing the object for being photographed.

12. The method of claim 8 wherein a specified geometrical shape of the object to be inspected is represented in a computer aided design computer program database.

13. The method of claim 8 wherein the ascertaining, preparing, operating, processing and orienting are all performed in accord with corresponding previously specified procedures.

14. The method of claim 13 wherein the previously specified procedures are stored in a computer program database having access thereto controlled by a selected entity.

* * * * *